Oct. 16, 1962 F. L. MOREHOUSE 3,058,545
DISPENSING MECHANISM

Filed Aug. 18, 1959 12 Sheets-Sheet 1

INVENTOR
Frank L. Morehouse

Oct. 16, 1962

F. L. MOREHOUSE 3,058,545

DISPENSING MECHANISM

Filed Aug. 18, 1959

INVENTOR

Frank L. Morehouse

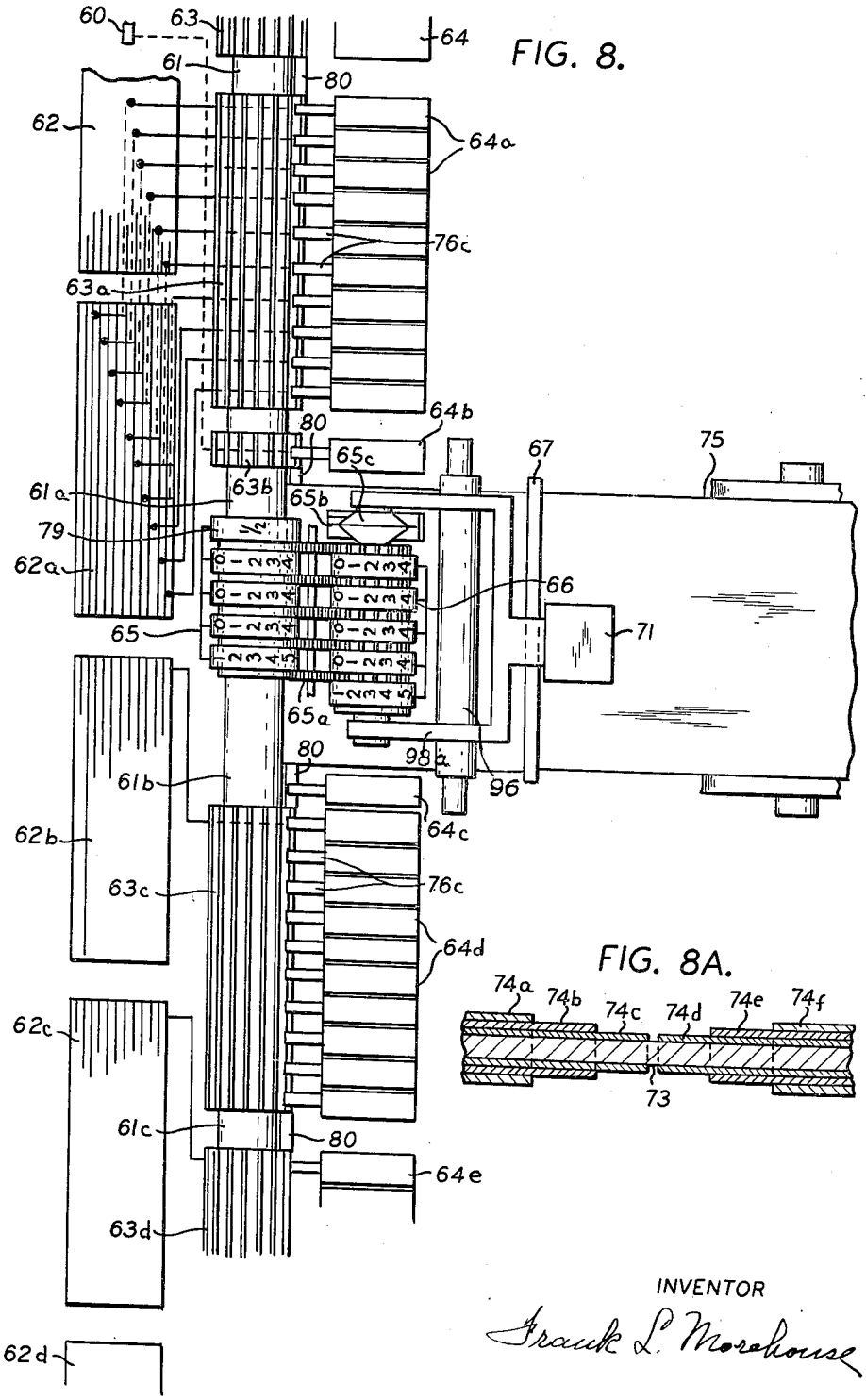

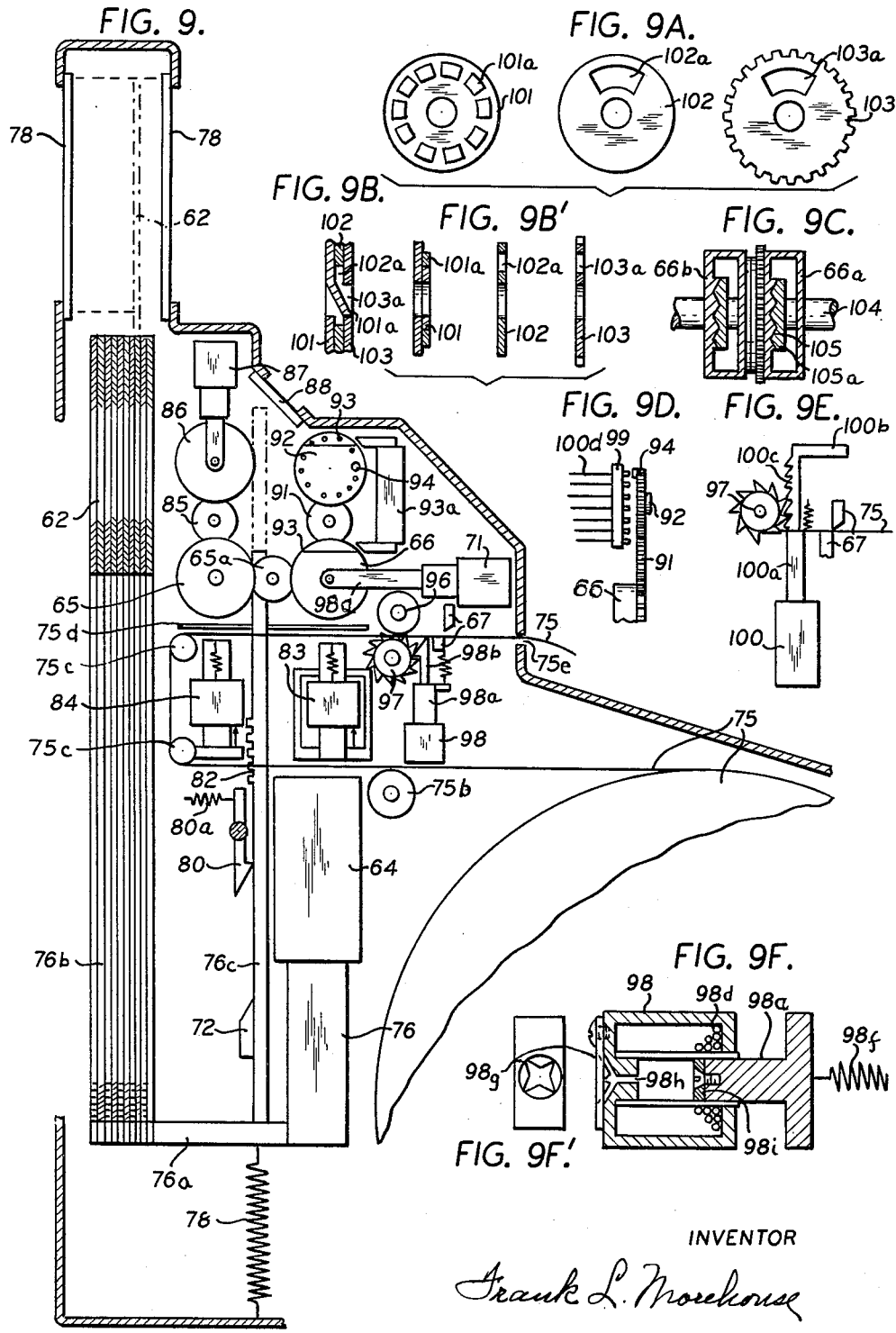

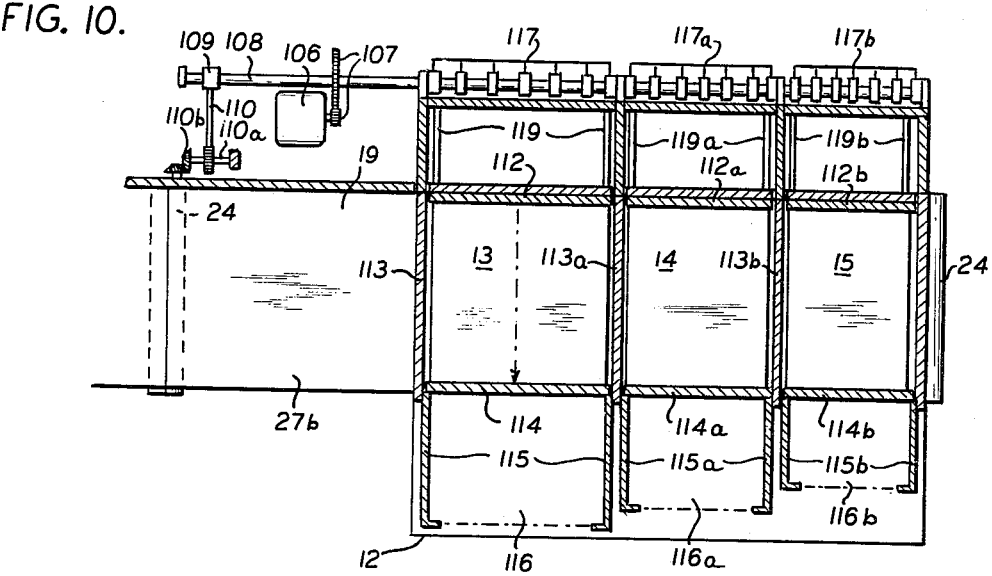
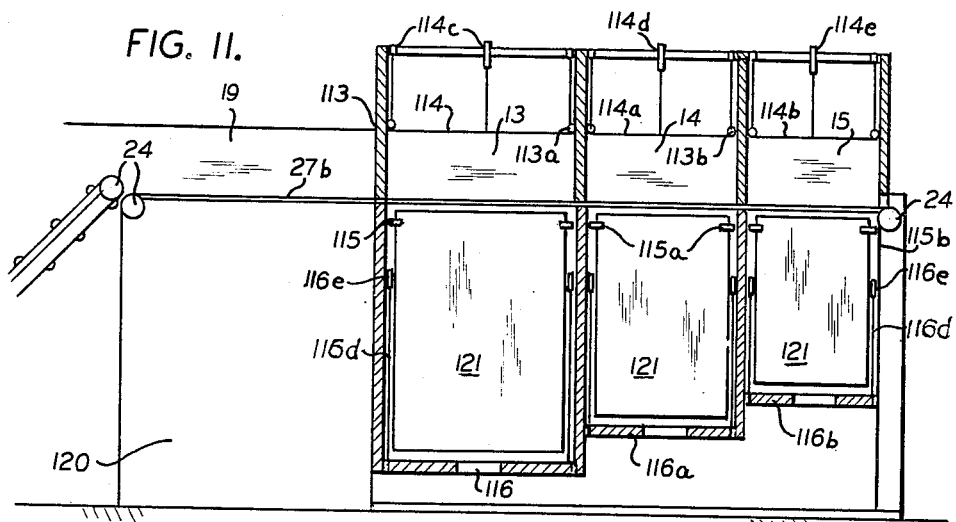
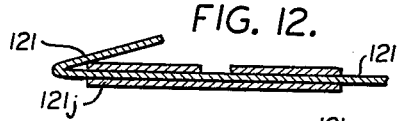
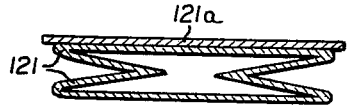

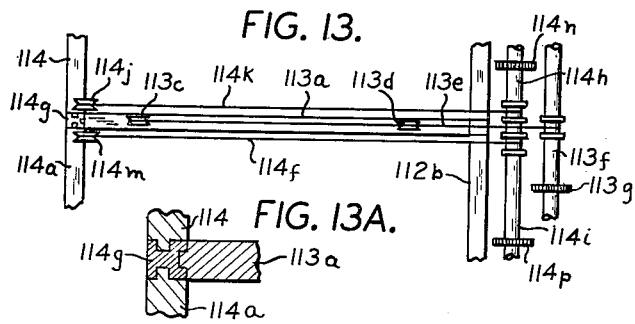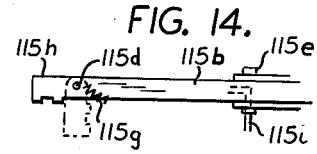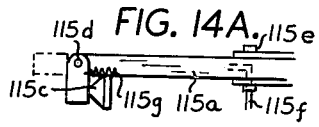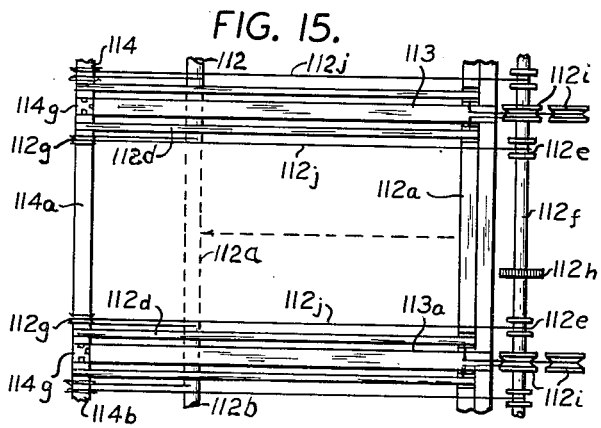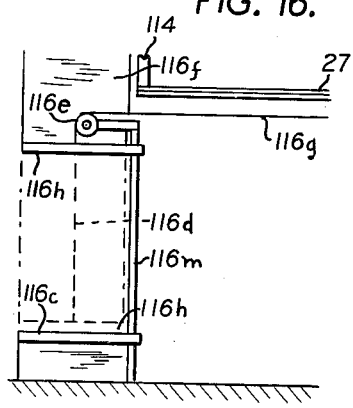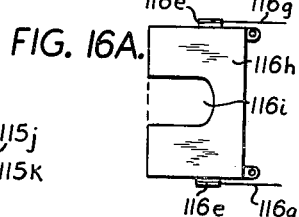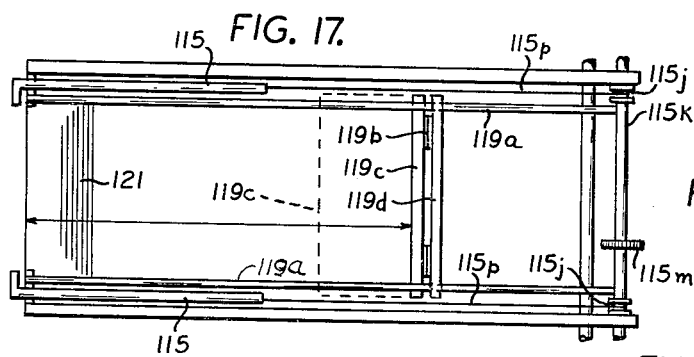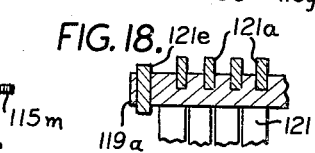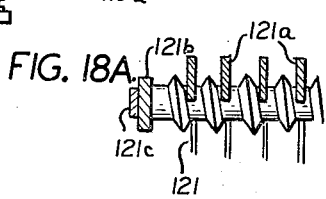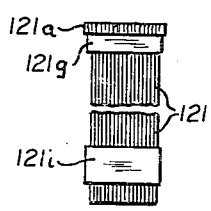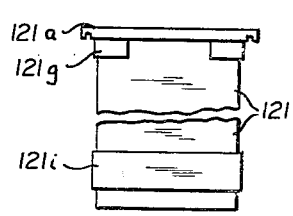

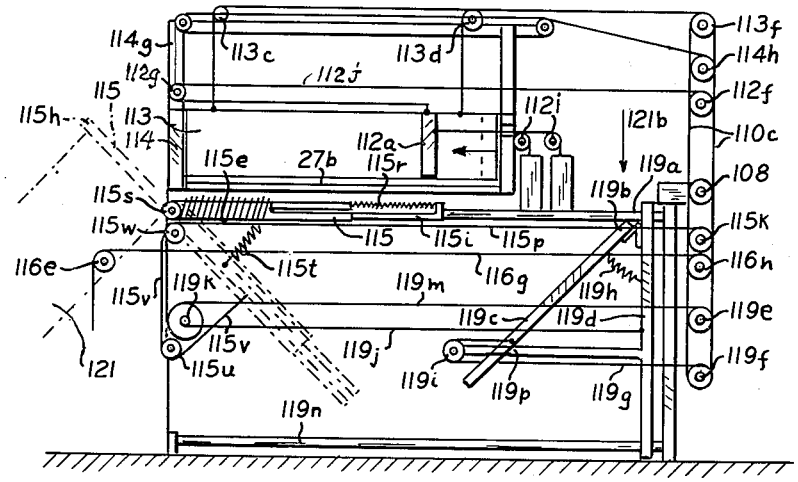
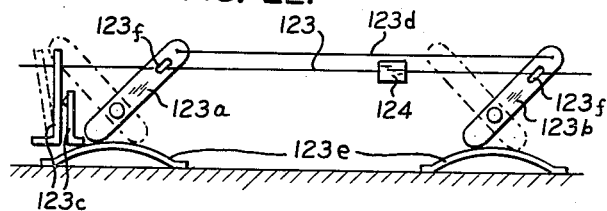
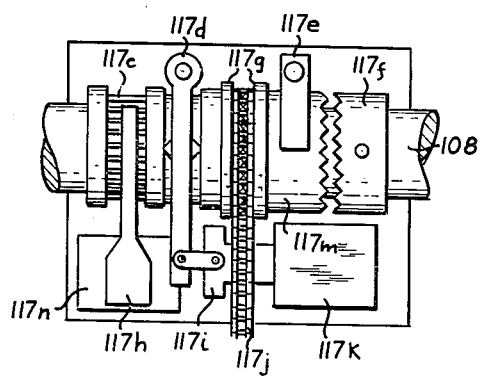
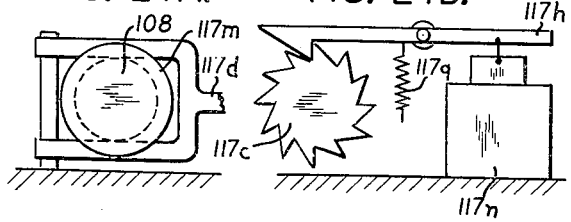
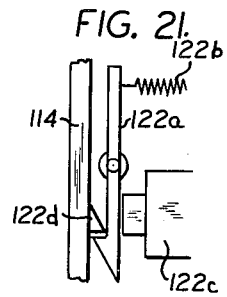
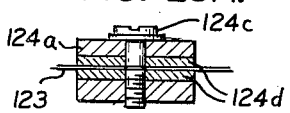
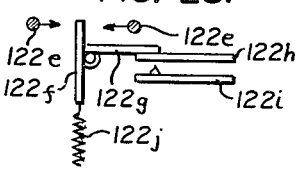

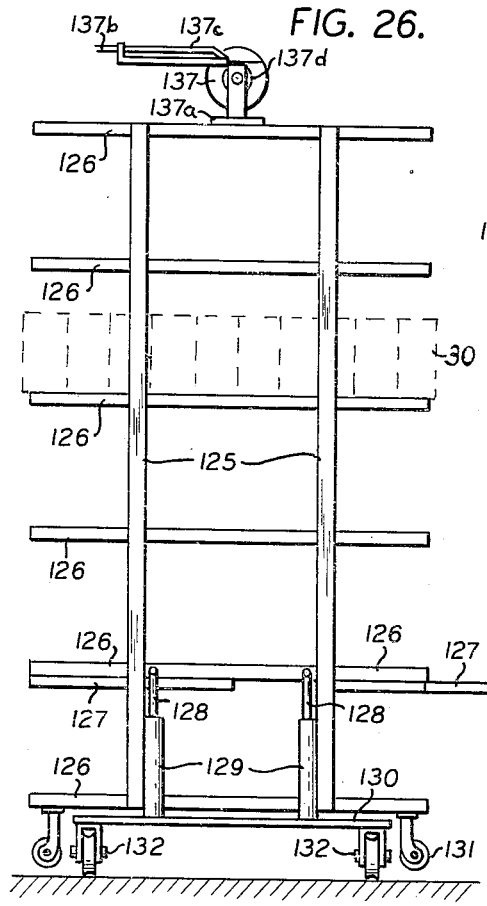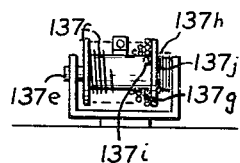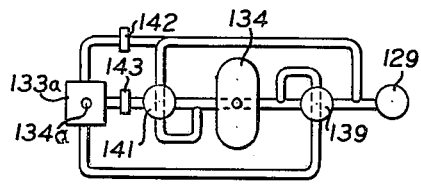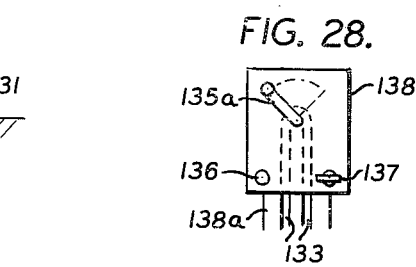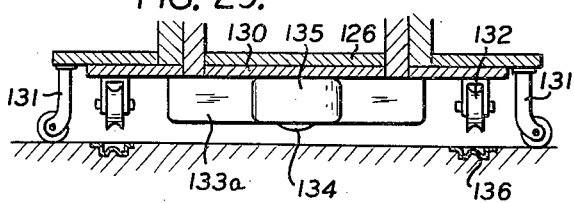

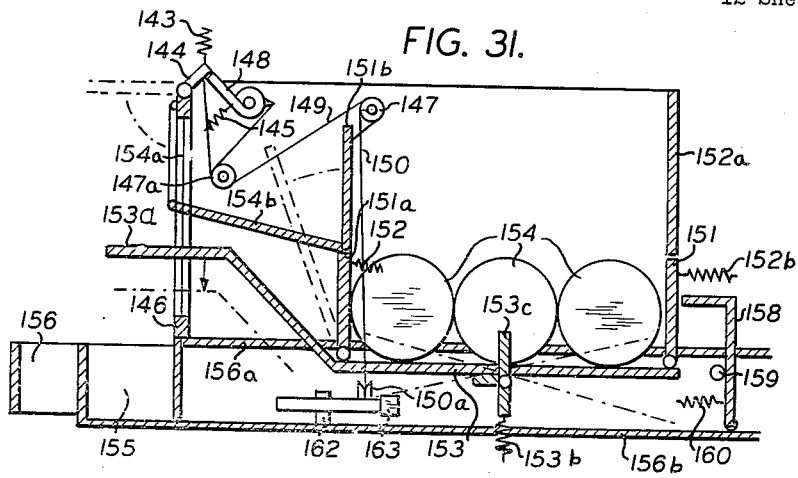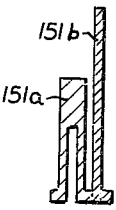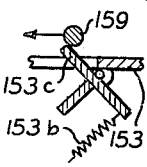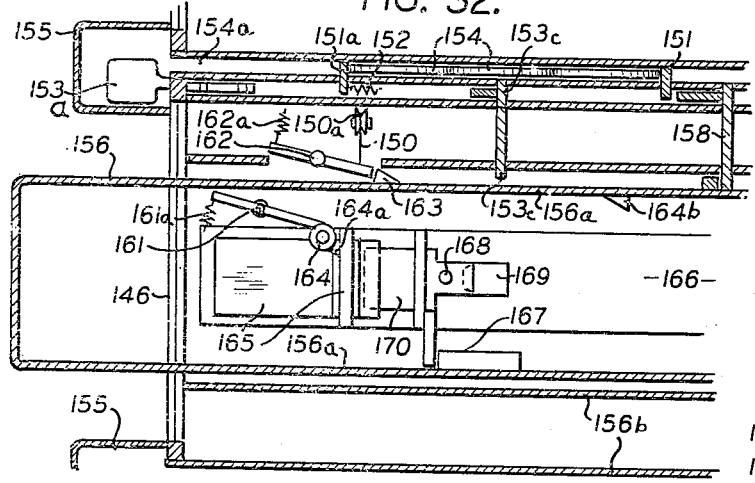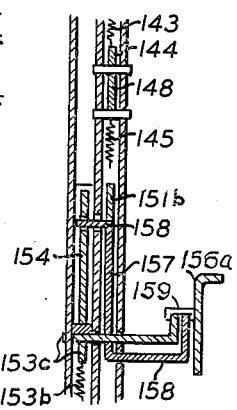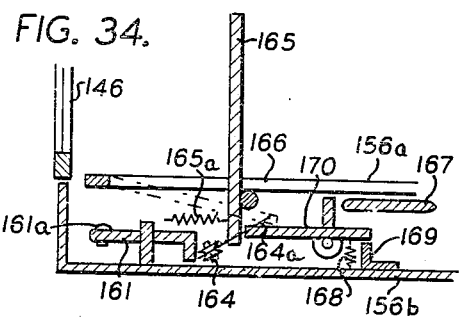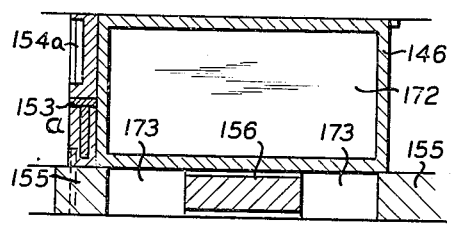

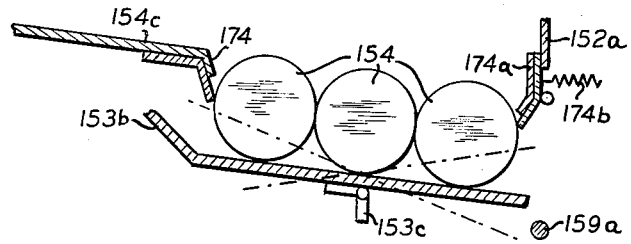
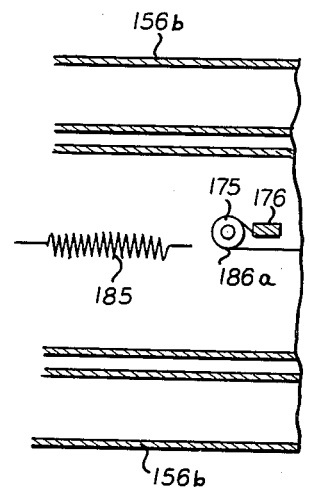
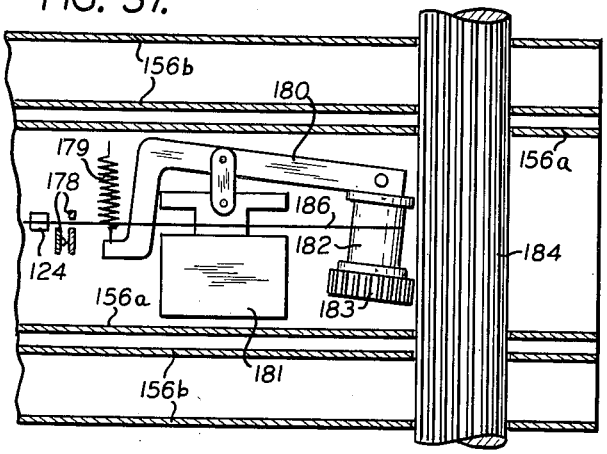
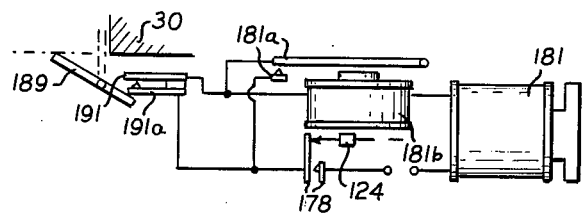
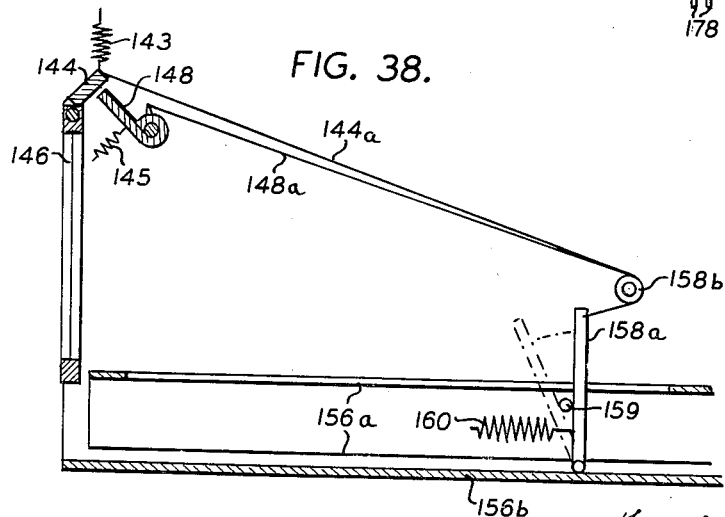

Oct. 16, 1962   F. L. MOREHOUSE   3,058,545
DISPENSING MECHANISM
Filed Aug. 18, 1959   12 Sheets-Sheet 12
FIG. 39.
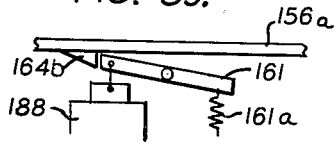
FIG. 40.
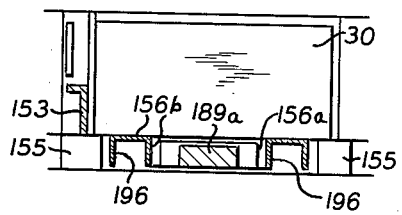
FIG. 39A.
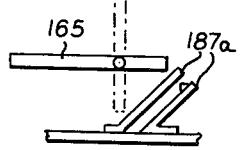
FIG. 40A.
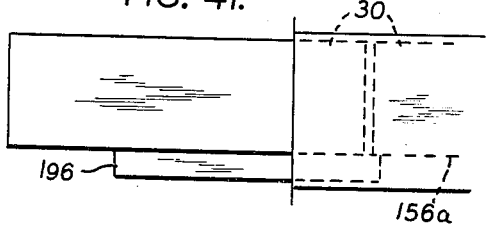
FIG. 41.
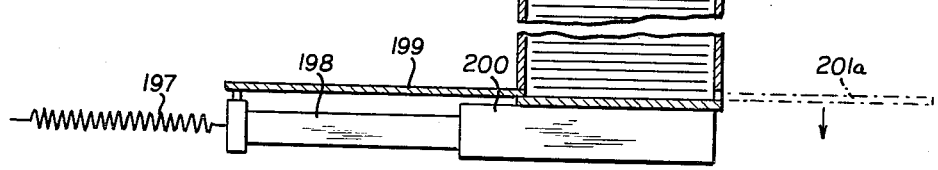
FIG. 42.
FIG. 43.
FIG. 44.
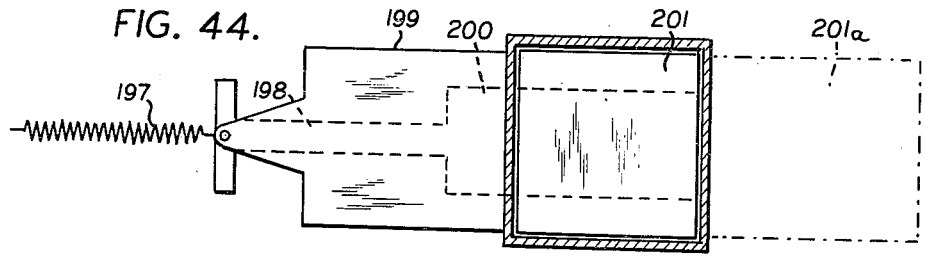
FIG. 45.
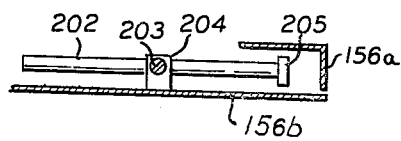
INVENTOR
Frank L. Morehouse

United States Patent Office 3,058,545
Patented Oct. 16, 1962

3,058,545
DISPENSING MECHANISM
Frank L. Morehouse, 96 Hawthorne St., Brooklyn, N.Y.
Filed Aug. 18, 1959, Ser. No. 834,625
10 Claims. (Cl. 186—1)

This invention is supplemental to patent application Serial No. 812,955, dated May 13, 1959. It is primarily a complete automation retail store, wholesale establishment, stock room, or it can be adapted to an assembly line. In this supplementary invention a series of conveyor belts and slides carry the articles from the assembly of dispenser units to an inspection section on a counter or other suitable location. A key on the control board operates each dispenser unit, and a series of price dials electrically connected to a registering device prints the price of each article and the totals, with other symbols if desired. A packaging device deposits the articles of each customer into a suitable size bag, and an elevator raises the package to a convenient height. A loader truck expedites the placing of the articles in the dispenser units. Coin operated mechanisms which lock and unlock the operating mechanism of the manual and power types of dispenser units are also included. With the additional equipment described in this patent application, a retail food store that does a substantial business can be operated by one attendant. There is no manual labor required, except loading the merchandise into the dispensing machines. All of the operations for delivering an order of merchandise can be accomplished completely by pressing buttons on the control board. A customer can be in and out in a few minutes with all they can carry. Errors in pricing are completely eliminated. The items can be grouped on the control board so they can be quickly located. The operator can stand or sit in one place without moving about. The customers have to do nothing but read their lists. Special items, seasonable merchandise, and new products can be effectively displayed to attract the attention of the shoppers in the store, or in the street windows. The appearance will be that of a compact, modernistic, attractive salesroom instead of an overcrowded, disorderly, unattractive and inconvenient warehouse, as no shelves or stacks of goods containing large quantities of the same article will be visible.

In the complete type of automation store assembly, the operator presses the proper key on the control board as the customer enumerates his wants. The key is held down by a magnet which indicates to the operator that the mechanism is operating properly and that the machine is not empty. The required number of electric wires run to the price register, depending on the number of digits in the price for each article, and the register prints the price on the roll of tape. Another wire runs from the keyboard to the corresponding dispenser unit, and the mechanism of the unit brings a line of articles forward so that the front article drops onto the conveyor belt and is transported to the slides or the elevating conveyor belt and then to the conveyor belt that delivers the articles to the counter. The inspection compartment at the end of the counter delivery belt, enables the operator to view all of the articles in each separate order, and the customers can also see what they are getting. When the order is complete the operator presses the total button on the keyboard and the price register prints the total amount of the order on the tape and cuts the tape. The operator hands the detached tape to the customer and receives the payment. In the meantime the operator has decided the size of the container the packages require, and presses the proper key on the control board to operate the selected package mechanism. The third packaging compartment requires no gate as it has a fixed end piece. As the proper cross gate and side gate open, the bag opening device pulls the bag open, the tilter lifts the bag up at an angle of about 45 degrees so the articles slide into the bag instead of falling, when the pusher on the opposite side of the selected loading compartment moves across the packager conveyor belt to push the articles into the open bag. Any number of packaging sections can be provided. The pusher automatically reverses and returns to the opposite side of the packager conveyor belt. The bag tilter then drops to the upright position which helps to jolt the articles into a more compact arrangement, or the bag can be automatically shaken. Then the package elevator operates to raise the bag to the counter height, and the customer inserts his hand into the hole underneath the bag to lift the packages off the elevator. A number can be dropped from the tab dropper into the inspection compartment, and the operator can hand the new customer a card with a corresponding number on it to identify the owner of that particular order, but this arrangement is optional.

The contents of a carton of articles is unpacked in the rear of the store and placed on the shelf of the loader that is approximately the height of the dispenser unit containing this particular article. The loader is then centered on the dispenser unit and the shelf slightly raised or lowered to an even height with the dispenser unit, and the articles are pushed into the proper dispenser unit.

A flap and locking piece can be installed on the front of each dispenser unit that automatically prevents any article being pushed out the front when articles are being loaded in the back, or a similar lock that is operated by a lever in the rear of the dispenser unit can be utilized.

The dispenser units require only two cross bars for support, and are held in place by two clips that adjust the dispenser units to the rotating driver shaft. Two electric conductors run on one of the cross bar supports, one a common ground, and the other is divided into separate sections about the width of the smallest dispenser unit, with a soldering lug for the wire that runs from the dispenser unit to the keyboard. Another wire can be run to an operating and empty signal light on the keyboard if desired, that is operated by a switch in the front end of the dispenser unit.

The dispenser unit can be readily lifted out of the frame for cleaning or repairing, and they automatically align themselves when slipped back into the frame. The frame for the dispenser units is constructed in sections of a size that will go through an ordinary door. The manually operated dispenser units require only a frame or rack, including those that are coin operated. The power driven dispenser units require a horizontal driving shaft for each row of units, and a vertical shaft to supply the power.

The keys on the control board group the articles into their logical classifications with the name of the article on each key, so an article can be easily located, but there is no similar relation necessary for the grouping in the dispenser assembly, as the articles there are mainly grouped by their height, as the width and length of the articles can vary indiscriminately in the sections. Some of the dispenser unit mechanisms adjust automatically to the length of the contained article, while some require that a movable stop be properly set in the mechanism. Some of the power operated dispenser units operate merely by removing the first article by hand, those following automatically moving forward to replace the removed article, with no conveyor belts for this type of unit. There are several types of dispenser units described in this and the other patent applications referred to, that can be used with the mechanism herein described.

Description of drawing figures;

FIG. 1, retail store plan.

FIG. 2, conveyor belts, drives and slides.
FIG. 2a, section of conveyor belts on supporting rack showing belt drives.
FIG. 3, top view of control keyboard.
FIG. 4, side view of control keyboard.
FIG. 5, side section of keys and dials.
FIG. 6, front sectional view of keys and dials.
FIG. 7, top view of keys.
FIG. 8, top view of registering device.
FIG. 8a, section of telescopic shaft for dials of registering device.
FIG. 9, side view of registering device.
FIG. 9a, end view of discs on pricing dials shaft of registering device.
FIG. 9b, edge section of discs of FIG. 9a.
FIG. 9c, section showing serrated discs and price dials of registering device.
FIG. 9d, edge view of driving gears and electric contact dials.
FIG. 9e, section of tape cutter mechanism for registering device.
FIG. 9f, section of air brake for solenoid coil.
FIG. 9F', air brake muffler.
FIG. 10, top view of packaging assembly.
FIG. 11, side view of packaging assembly.
FIG. 12, bag holder.
FIG. 12a, top of bag.
FIG. 12b, bag partly open.
FIG. 13, top view of cross gate and adjoining side gate.
FIG. 13a, section of gate post.
FIG. 14, magnetic bag openers.
FIG. 14a, suction bag opener.
FIG. 15, top view of pusher.
FIG. 16, package elevator.
FIG. 17, top view of bag opener and bag tilter.
FIG. 18, smooth rod bag support.
FIG. 18a, threaded bag supports.
FIG. 19, side view of method of packing bags.
FIG. 19a, front view of method of packing bags.
FIG. 20, side section of packaging assembly.
FIG. 21, catch with solenoid.
FIG. 22, distance switch.
FIG. 23, side sectional view of cord stop.
FIG. 23a, top sectional view of cord stop.
FIG. 24, electric clutch.
FIG. 24a, pivoted arm for sliding connector for electric clutch.
FIG. 24b, side view of catch to prevent backward motion of clutch shaft.
FIG. 26, side view of loader.
FIG. 26a, sectional view of electric cord winder mounted on loader.
FIG. 27, base plan of loader.
FIG. 28, loader controls.
FIG. 29, loader with platform raised.
FIG. 30, loader tubing diagram.
FIG. 31, side view of manual coin operated dispenser unit.
FIG. 31a, front view of return coin release lever.
FIG. 31b, side view of ineffective forward motion of tripping lever.
FIG. 32, top view of manual coin operated dispenser unit.
FIG. 33, front sectional view of two vertical spaces of the manual coin operated dispenser units of FIGS. 31 and 32.
FIG. 34, side section of locking flap of FIG. 32.
FIG. 35, front view of manual coin operated dispenser unit.
FIG. 36, side view of coins in power operated dispenser unit.
FIG. 36a, front view of release lever.
FIG. 37, top view of rear end of power coin operated dispenser unit.
FIG. 37a, wiring diagram of FIGS. 36, 37, 40 and 40a.
FIG. 38, side view of door lock and opener of power coin operated dispenser unit.
FIG. 39, release for power coin operated dispenser unit.
FIG. 39a, side view of pivoted flap and switch.
FIG. 40, top view of automatic dispenser unit mechanism.
FIG. 40a, side view of automatic dispenser unit mechanism.
FIG. 41, side view of extension article holder.
FIG. 42, front view of extension article holder.
FIG. 43, side view of tab dispenser.
FIG. 44, top view of tab dispenser.
FIG. 45, stop for dispenser unit movable center section.

The best mode of the invention comprises a horizontal removable dispenser unit of adjustable width, mounted on a sectional dismountable supporting rack of adjustable height, with a plurality of horizontal rotatable fluted driving shafts mounted on the supporting rack, means of driving the shafts; in combination with the horizontal conveyor belts, side guides, belt supports, belt idler pulleys, vertical driving shafts, belt tension springs, slides for the horizontal conveyor belts, the elevator conveyor belt and the counter conveyor belt, cleats for the belts, as shown in FIGS. 2, and 2a, a control keyboard with a key for each dispenser unit and for each packager unit and for the incher for the counter conveyor belt, each dispenser unit key electrically connected to a price register, the pricing mechanism capable of changing the price of each article, as shown in FIGS. 3, 4, 5, 6 and 7, a price register that prints the price of each article and the total on a tape, a means of recording and adding a ½ cent price, a series of numbers visible when elevated that records prices and totals, a shear for cutting the tape, as shown in FIGS. 8, 8a, 9, 9a, 9b, 9c, 9d and 9e, and a delayed solenoid magnet as shown in FIG. 9f and 9F', a plurality of packaging units arranged along the counter conveyor belt that places the order of each customer in a suitable size bag, a special type of reinforced and mounted bag, a magnetic bag opener, a bag tilter, cross and side gates to guide the articles, a pusher for moving the articles into a bag, elevators that raise the bags to counter height, a handhole in the platform of the elevator to facilitate removing the package, as shown in FIGS. 10, 11, 12, 12a, 12b, 13, 14, 14a, 15, 16, 17, 18, 18a, 19, 20, 21, 22, 23, 24, 24a and 24b, a hydraulic loader with shelves of adjustable height, the loader movable back and forth to adjust to the dispenser units, and having wheels to run on tracks properly positioned in relation to the dispenser units, and mechanism to lift the loader off the tracks to run on castors in any direction on the floor, as shown in FIGS. 26, 26a, 27, 28, 29 and 30, an electrical tab dropper operated by a push button that drops a tab on the conveyor belt among the articles of a specific order of goods, to match a similar tab handed to the customer, as shown in FIGS. 43 and 44, an inspection compartment where the customers and attendant can examine the merchandise, and an arrangement of the mechanism to prevent handling and pilfering by the customers as shown in FIG. 1.

In the cycle of operation of the packaging mechanism, the cross and side gates are normally down, the bag tilter, bag opener, bag opener tilter and the article pusher are normally retracted, and the elevator is up. The magnetic key on the keyboard for a specific size packager activates the connecting magnets of the clutches of the associated cross gate or gates, side gate, bag incher, bag tilter, bag opener, and bag opener tilter, and the releasing magnets of the spring catches holding the elevator up. The associated side gate mechanically opens a spring switch at the top of the rise and breaks the current to the magnetic key on the keyboard which disconnects the aforementioned devices, the motions of which are synchronized in operating time by varying the size of their winding reels. The associated cross and side gates, the bag incher, bag tilter, bag opener and bag opener tilter are held in position by a holding ratchet in their clutches that is released by a magnet in the clutch. The associated side gate also mechanically closes a magnetic switch at the top of the rise that is in a second electrical circuit which activates the connecting magnets of the clutch to move the associated pusher forward, and the releasing magnet of the holding ratchet of the clutch of the first cross gate to close the inspection compartment for the next order. The pusher strikes a spring switch adjacent the end of the forward run which momentarily breaks the current to and releases the magnetic switch on the associated side gate post in the second circuit which disconnects the connecting magnet in the pusher clutch. The pusher also strikes a toggle lever at the end of the forward run which connects a spring switch in a third circuit that activates the magnets that release the holding ratchets of the clutches to return the associated cross and side gates, the pusher, bag tilter, bag opener and bag opener tilter, to the starting position by spring, gravity or weights, and raises the elevator by activating the connecting magnet in the clutch. The pusher strikes a toggle lever at the end of the return run that is connected by a cord to the toggle lever at the end of the forward run of the pusher, and retracts the forward toggle lever, and the adjacent switch returns to the open position to disconnect the aforementioned devices in the third electrical circuit.

FIGS. 31, 31a, 31b, 32, 33, 34 and 35 utilize the fixed frame and movable center section type of dispenser unit, and are a manual operated coin type, and only require a supporting rack.

FIGS. 36, 36a, 37, 38, 39, 39a, 41 and 42 are a power operated coin type of dispenser unit and require a supporting rack and fluted horizontal power shafts at the rear of the supporting rack similar to FIG. 2 of this application and FIGS. 46, 47, 48 and 49 of patent application Serial No. 812,955.

FIGS. 40 and 40a are a switch and lock for a power type of dispenser unit that utilizes a supporting rack and fluted horizontal power shafts, the dispenser unit being an automatic manual type, and is an improvement on the dispenser unit in patent application Serial No. 812,955, FIG. 32.

FIG. 45 is an improvement on the types of dispenser units in patent application Serial No. 812,955 that have no other means of limiting the forward movement of the pull handle type movable center section such as FIGS. 2 and 3, 7 and 8, 9 and 10, 11 and 12, in Serial No. 812,955.

The operating mechanism of the dispenser units with a fixed frame and a movable center section are used in the assembly described herein, which lifts the contained articles off the side flanges of the fixed frame and moves the articles forward, and the movable center section drops down and returns under the articles which again rest on the side flanges of the fixed frame.

Figure 1:
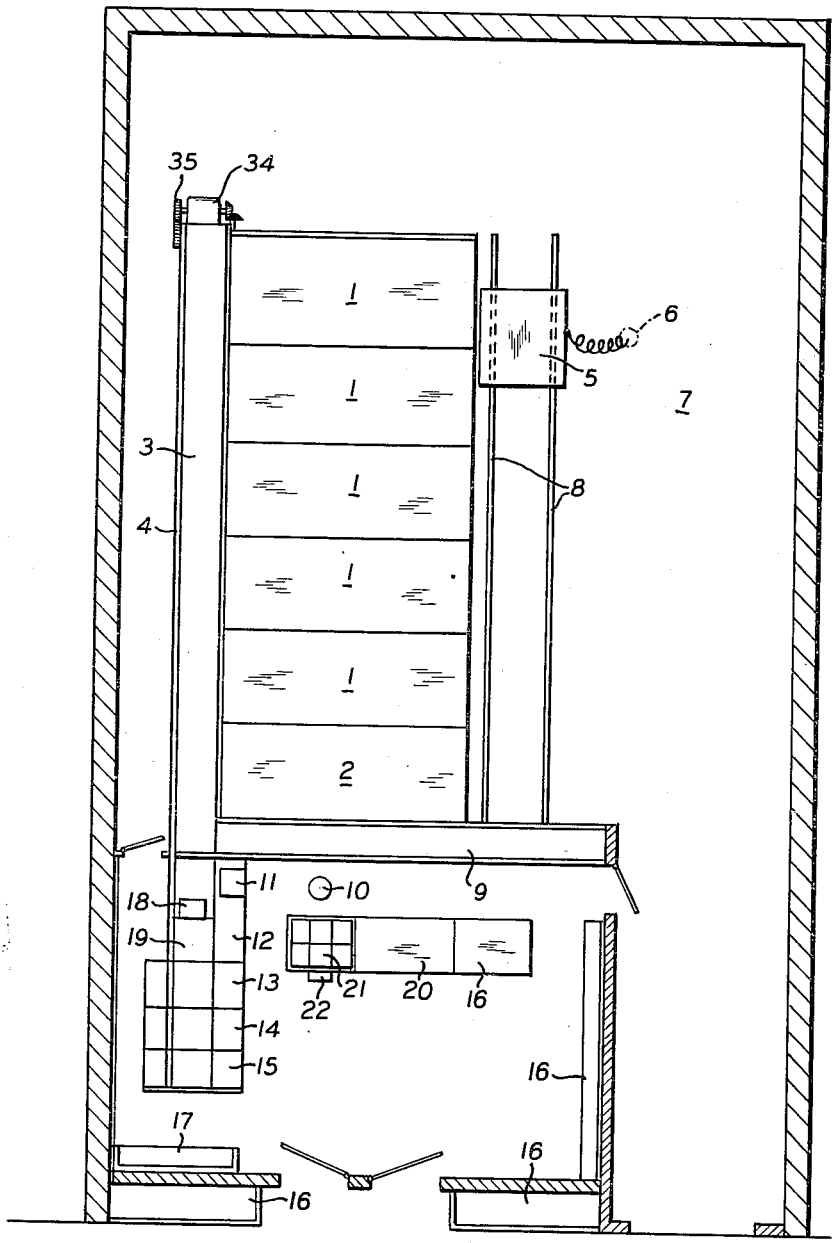

The sections of dispenser units 1, in FIG. 1, and the refrigerated section of dispenser units 2, discharge their contents on a conveyor belt assembly 3, and the articles 30 are prevented from falling off by the guard rails 4, which can be suitably padded. The loader 5 has a flexible electric cable connected to a centrally located ceiling outlet No. 7 in the loading space. The tracks 8 for the loader 5 run close to the dispenser units 1 and 2 so the articles can be pushed directly in. A series of shelves and compartments 9 can be used for the storage of bags, supplies, etc., and for accounting purposes. The operator's stool 10 is conveniently located near the cash drawer 11, the counter 12, the inspection compartment 19, and the control keyboard 21. Large, medium and small folded bags are stored at the rear of platforms 13, 14 and 15 respectively. Displays 16 can be located in the windows, along the side wall, and at the end of the general counter 20. A seat 17 is provided. The tab dropper 18 is located at the inspection compartment 19. The general counter 20 has the control keyboard 21 at one end, which mounts the price register 22.

Figure 2:
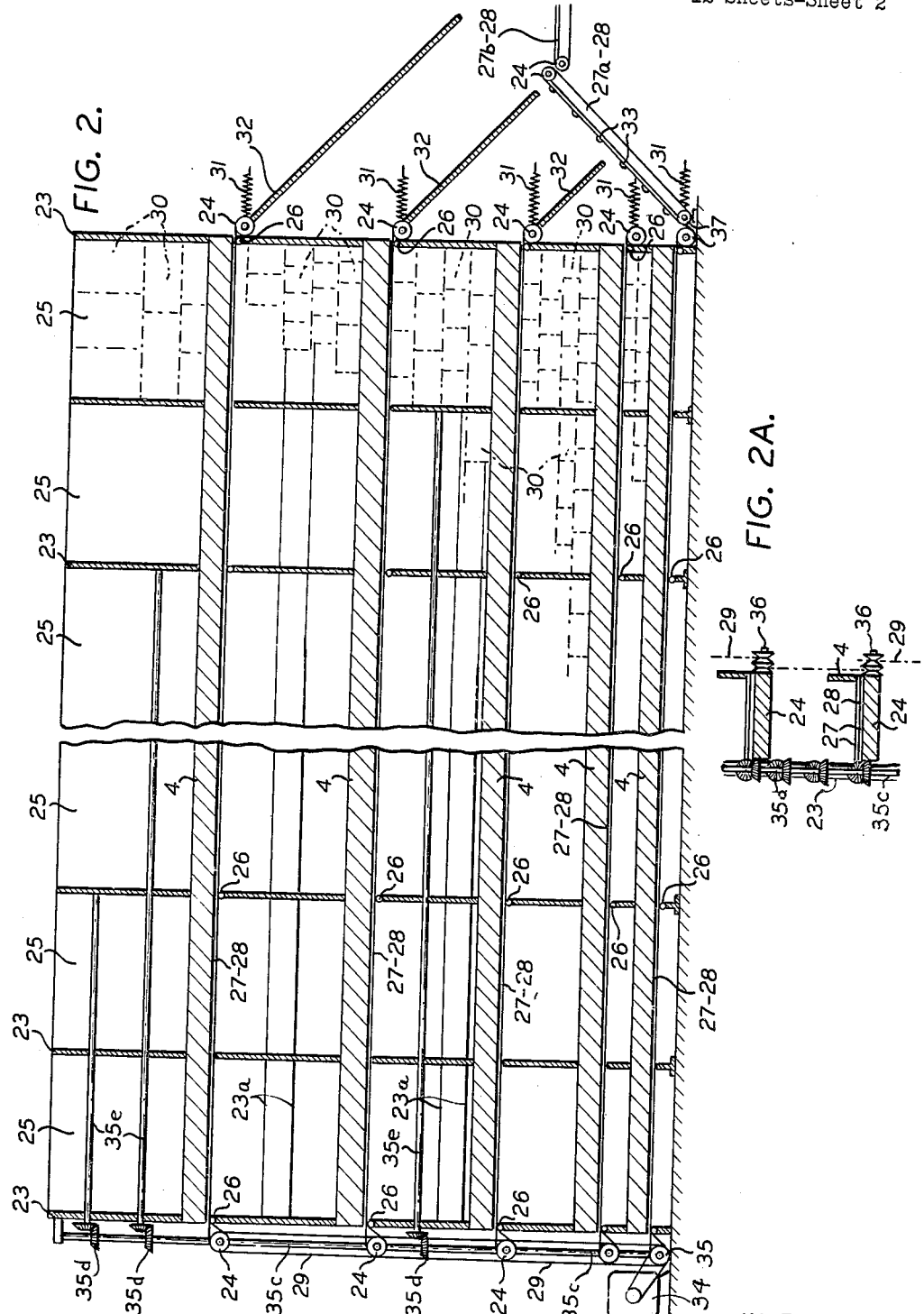

The conveyor belts 27 in FIGS. 2, and 2a, and the slides 32 transport the articles 30 from the dispenser unit sections 1 and 2. The parallel horizontal conveyor belts 27 with flat supports 28, have pulleys 24 and idlers 26 underneath the conveyor belts 27 that reduces the space between the upper and lower conveyor belts 27 to a minimum. The motor 34 is connected by a reduction gear 35 to a series of chain belts 29 running over sprockets 36 on the ends of the pulleys 24, that one end of the conveyor belts 27 run over. Springs 31 attached to the pulleys 24 at the other end keep the conveyor belts 27 tight. Conveyor belt 27a is run by two gears 37 on the pulleys 24 of the conveyor belts 27 and 27a. Conveyor belt 27b has a separate motor. Each conveyor belt has a guard rail where necessary. The inclined conveyor belt 27a brings the articles 30 from the lower conveyor belts 27 up to the conveyor belt 27b at the counter level. All conveyor belts have cleats 33 to prevent the articles from rolling and slipping. A switch starts and stops motor 34, which runs continuously when the dispenser units are in use and provides power for the driving shafts 35e of each horizontal row of dispenser units and the horizontal conveyor belts 27. Posts 23 support the crossbars 23a that hold the dispenser units that occupy spaces 25. The conveyor belts 27 are spaced so that the drop of each article 30 when it is pushed out by the dispenser unit, is not great enough to cause damage, and the articles 30 are so arranged that non-fragile articles will fall a short distance on articles that are not easily damaged. The dropping of one article on another will occur only occasionally. In some of the two level types of dispenser units the movable center section drops down as it returns, and leaves a raised ledge at the forward edge of the fixed frame section, that pushes the article off onto the conveyor belt. The articles in each row of the sections 1 and 2 are grouped by approximately equal heights to conserve space. The motor 34 also drives the upright power shaft 35c which drives the horizontal fluted driving shafts 35e for each horizontal row of dispenser units.

Figure 3:
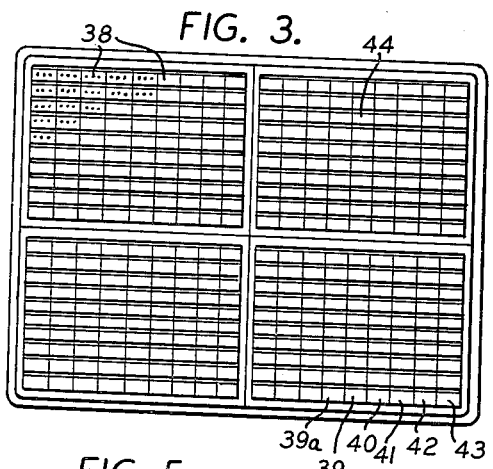

The control keyboard in FIG. 3 is constructed in sections 44, four of which are shown, but any number can be used to correspond with the number of dispenser units installed. The control keyboard 44 can also be expanded at any time by adding new sections. A panel type of key 38 takes up the horizontal steps of the keyboard 44. Key 39a is the incher for the counter belt 27b, key 39 operates the tab dropper FIGS. 43 and 44. Keys 40, 41 and 42 operate three sizes of packaging mechanisms 13, 14 and 15, and key 43 totals the price registering device FIGS. 8 and 9. Keys 39, 39a, 40, 41, 42 and 43 do not have dials. Keys 39 and 39a do not require magnets.

Figure 4:
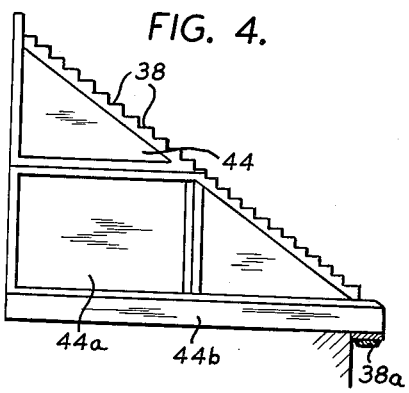

The panel keys 38 in FIG. 4 are grouped in sections 44, which are assembled on the side section 44a and the base section 44b. A safety switch 38a located underneath and out of sight, can be turned off to prevent meddling, or if the control board is unattended.

Figure 5:
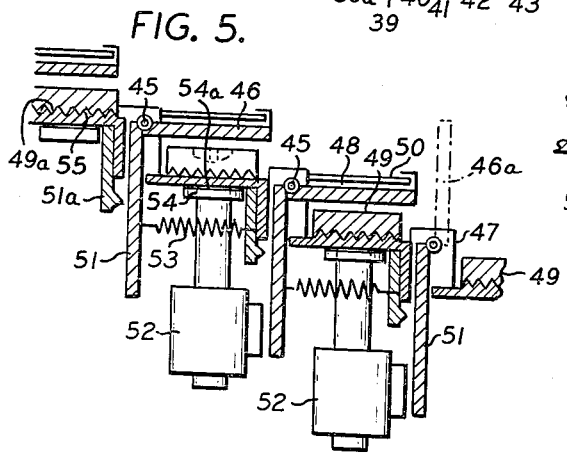

The shaft 45 in the bearing 47 in FIG. 5, allows the panel or key 38 to act as a hinge, with a horizontal member 46 and a vertical member 51 which is held by the spring 53, attached to the frame 55, and closing the switch arms 51 and 51a energizes the magnet 52 that holds the arm 51 in contact until the current is broken by a switch in the dispenser unit when it has moved the article out the required distance. The description of the contained articles is printed on the tab 48, which is protected by a transparent cover 50, and the tab can be easily changed by slipping in and out. The panel key 46 can be moved up to the position 46a to give access to the price dials 49 underneath. The underside of the dial 49 has a serrated surface 49a to match the serrated surface of the frame 55 underneath, the serrations corresponding to the spacing of the symbols on the dials 49.

A spring washer 54a held in place by the nut 54 underneath the frame 55, gives the required tension to the serrations.

Figure 6:
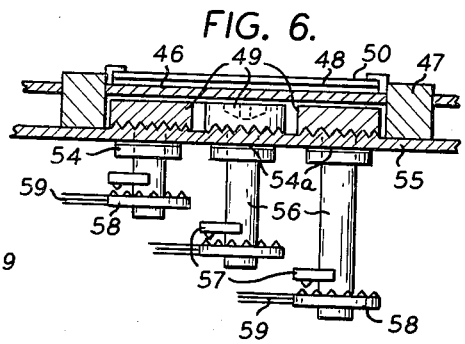

The key 46 in FIG. 6 has formed ends which hold the name card 48 and the transparent cover 50 in place. The dials 49 have cross cuts and a depressed center to make it possible to insert and hold in place a suitable tool to turn the dials 49. A projecting arm 57 on each dial stem 56 contacts one of the contact points on the disc 58, and the wires 59, usually about ten, are brought together into about thirty wires for a three dial control board, and connected with the registering device FIGS. 8 and 9.

Figure 7:
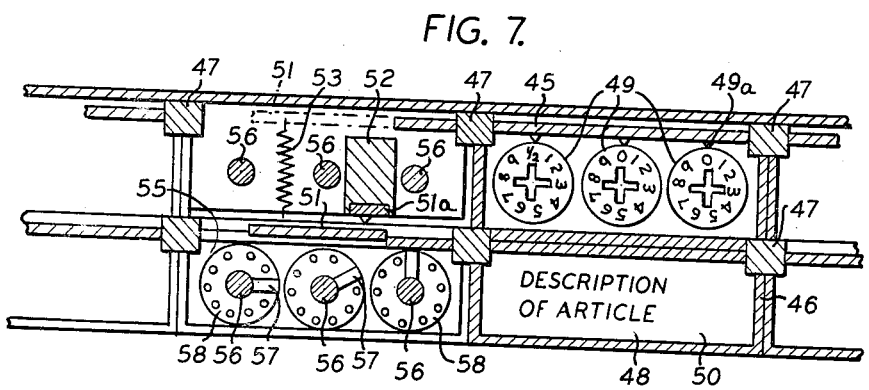

The upper left section in FIG. 7 shows the three dial stems 56, the key shaft bearing 47, the spring 53 attached to the fixed switch arm 51a, and the movable switch arm 51. The switch arm 51a is insulated, and the arm 51 is grounded to the frame 44. The upper right section shows the panel key shaft 45, the bearing 47, the pointer 49a, and the three dials 49 with symbol indicated for each. The lower left section shows the movable switch arm 51, the projection contact arms 57 on the dial rotating stems 56, and the fixed wire discs 58. The lower right section shows the name card 48, which describes the article and which is under the transparent cover 50, both of which are attached to the panel key 46.

In FIGS. 8, 8a, 9, 9a, 9b, 9B', 9c, 9d, 9e, 9f, and 9F', the ½ cent visible symbol 60, and the other visible symbols 62, 62a, 62b, 62c, etc., are the conventional symbols of units, or cents, tens, dollars and ten dollars. Additional symbols can be substituted or added on each end, as indicated by 62d, and rearranging the sequence as required. The telescopic shaft assemblies 61, 61a, 61b and 61c, are made up of a central stationary round supporting rod 73, with two sets of additional round concentric telescopic shafts in pairs, 74a and 74f, 74b and 74e, 74c and 74d, for the gears 63, 63a, 63b, 63c and 63d, which are operated by the plungers 76 of the solenoids 64, 64a, 64b, 64c, 64d and 64e moving up. Each gear 63, 63a, 63b, 63c and 63d operates one of the symbol dials 65, which are connected to the total dials 66 by the gears 65a. The ½ cent electric connection on the key of the control keyboard can be placed in the zero space of the highest price dial as shown in FIG. 7, as the zero there is not required. The ½ cent printing dial 79 has two ½ cent marks equally distant. The first ½ turn by the solenoid 64b prints and also turns the total dial 66 one cent, but the second half turn prints on the dial 65, but does not turn the total dial 66, which only turns each full revolution. The projecting piece 72 holds each solenoid arm 76c up by engaging the catch 80 which extends the full length of all of the solenoids 64, 64a, 64b, 64c, 64d and 64e. When a new set of solenoid arms 76c come up, the projecting piece 72, which is elongated to give a time interval, forces the arm 80 back against the spring 80a, and lets the springs 78 pull the previous set of solenoid arm 76c down. The single solenoid 64c is a dummy that always goes up to insure tripping the bar 80. When a key is depressed on the control board 44, the corresponding solenoid 64 draws the plunger 76c up, and the gear teeth 82, usually one to ten, operate the proper gear of 63, and the number of teeth turn the gear to the corresponding symbol on the dials 65. The teeth 82 are placed at the bottom of the arms 76c so the solenoid plungers 76 will always travel the same distance to raise the symbols 62, which are connected to the solenoid plungers 76 by the arms 76a and 76b, and are visible through the transparent panels 78. The dials 65 actuate the gears 85 which operate the daily or grand total dials 86. The solenoid 71 draws back and disconnects the total dials 66 so they can return to the blank position. The solenoid 87 draws the dials 86 up to disconnect from dials 65, to make it possible to manually reset dials 86 through the locked removable transparent panel 88. The gears 65a operate the total dials 66, which are non-magnetic but have a magnetic weight 93 in them that drops to the bottom to return the dials 66 to their blank position. The magnet 93a will draw the dials 66 off dead center if necessary by a momentary current. Magnet 93a also controls discs 92 which are non-magnetic with a magnetic weight in them, and are connected to dials 66 by gears 91. The rotatable gears and discs 92 have an electric contact point 94 that connects with one of the points on the fixed dial 99 corresponding to the symbol on the total dials 66, and actuates the solenoid 64 to make the total figures 62 visible through the transparent panels 78. This operation is controlled by the total key 43 on the control board 44. A reverse solenoid 84 connected by a delay relay to the ground for the price keys on the control keyboard 44, presses against the tape 75 which presses against an inked ribbon 75d which moves each impression, and imprints the symbol from the dials 65 on the tape 75. The reverse solenoid 83 operates by a delay relay and is connected to the total key 43 of the control board 44, and prints the totals on the tape 75, which travels over rollers 75b and 75c, and between rollers 96 and 97, and out the slot 75e. The solenoid 98 is connected by a delay relay with the ground for each key 38 of the dials on the control keyboard 44, and draws in the plunger 98a and the hook 98b on the end and turns the ratchet and roller 97, which presses against roller 96 to draw the tape 75 forward one space. The solenoid 100 is mounted on the other end of the roller 97 and is operated by the total key 43 of the control keyboard 44, through a delay relay, and draws in the plunger 100a, and the hooks 100c on the end turns the ratchet and the roller 97 the required distance for properly spacing the total inprint. The margin at the beginning and the end of the tape 75 is determined by the position of the shears 67, which can be operated by the projection 100b spaced to give the proper delay action. The plungers of the solenoids 83, 84, 98 and 100 are returned by springs. All of the rotatable dials such as 66b in FIG. 9c, have a disc 101 attached, with as many flat metal springs 101a as there are symbols. Between each symbol dial is a disc 102 attached to the non-rotatable shaft 104, with a hole 102a. The adjoining symbol dial 66a has a cog wheel 103 attached, with a recess 103a. The spring 101a on the disc 101 on dial 66b projects through the hole 102a in the fixed disc 102, and falls into recess 103a in the cog wheel 103 attached to dial 66b, and dial 66a gives dial 66b a turn equivalent to one symbol every full turn of dial 66a. The serrated spring discs 105 are attached to the dial 66a and 66b and maintain the alignment by contact with the spring discs 105a attached to the non-rotatable shaft 104. When the solenoid 71 draws the dials 66 backward, the projection on the fixed piece 65b in FIG. 8, presses the bevelled piece 65c outward, which is attached to the non-rotating shaft 104, and separates the serrations 105 from 105a, so the weights 93 can freely return the dials 66 to the zero position. Dials 92 also have a similar arrangement. The solenoid magnet 98 in FIG. 9F, with the winding 98d, has a tight fitting plunger 98e, with a flexible washer 98i at the end, to compress the air as the plunger 98e travels inward, and a small hole 98h that increases in size outwardly releases the air. An attached piece 98g acts as a baffle to muffle the air. The air compression, in conjunction with the spring 98f, retards the quick action of the solenoid 98 so the roller 97 will not slip on the tape 75. This type of solenoid can be used in other places in the dispenser or packaging mechanism where it may be desirable to slow down the action of the plunger.

The motor 106 in FIGS. 10 and 11 runs continuously while the dispenser assembly is in use, and turns the main drive shaft 108 for the packaging assembly through the reduction gears 107. The clutch 109 drives the chain 110, and the sprocket and shaft 110a, with the mitre gears 110b that drive the roller 24 and the counter conveyor belt 27b. The clutch 109 is normally operated by the packaging keys 40, 41 and 42, but the button 39a on the control board 44 can be used to inch the counter conveyor belt 27b if the articles in the inspection compartment 19 do not properly distribute. The power shaft 108 has clutches for each of the three sections 117, 117a and 117b, which are the cross gates 113, 113a and 113b, the side gates 114, 114a and 114b, the pushers 112, 112a and 112b, the bag openers and bag opener tilters 115, 115a and 115b, the bag tilters and the bag forward movers or inchers 119, 119a and 119b, and the package elevators 116, 116a and 116b. Key 40 of the control keyboard 44 raises gates 113, 113a, 113b and 114b. The clutches 117, 117a and 117b open each side gate 114, 114a and 11b, and cause the pushers 112, 112a and 112b to move across the belt 27b, and push the articles into the opened bags 121. All of the three keys 40, 41 and 42 start the belt 27b. The inspection compartment 19 is at the forward end of the counter conveyor belt 27b which travels through the three packaging compartments 13, 14 and 15, underneath each of which are two bag openers 115, 115a and 115b. Two pulleys 116e, and cords 116d, raise each of the package elevators 116, 116a and 116b. A storage compartment 120 is under the inspection compartment 19. The bags 121 are stored under the package compartments 13, 14 and 15, and are supported on rods 119, 119a and 119b. No. 12 is a platform.

In FIGS. 12, 12a and 12b a non-magnetic strip 121a of reinforcing plastic or other suitable material, is fastened to the back top edge of the folded bag 121, which is made of paper or other suitable material. The two ends of the reinforcement 121a are cut out to ride on the two bars 119, or to fit into the thread of the two rods 121c. The bags 121 are folded flat in a way to permit of easy opening. The two strips of magnetic metal 121j are attached to the bag 121 for the magnetic opener FIG. 14. A magnetic powder can also be made to adhere to the bags 121.

The cross gate 113a in FIGS. 13 and 13A, and the side gates 114, and 114a fit into grooves in the end posts 114g. Two cords 113e joined to gate 113a, wind on the reel on shaft 113f driven by the sprocket 113g which is connected by a chain to shaft 108. One cord 113e passes over pulley 113c, and the other over pulley 113d, and raises gate 113g. Two cords, one 114k and a similar one on the other end, are joined to gate 114, and wind on the reels on shaft 114h, driven by the sprocket 114n, and passing over pulleys 114j, raise the gate 114. Two cords, one 114f and a similar one on the other end are joined to gate 114a and wind on the reels on shaft 114i, driven by sprocket 114p, and passing over pulleys 114m, raise gate 114a. Cross gates 113, 113a and 113b, and side gates 114, 114a and 114b, are returned by their own weight.

In FIGS. 14 and 14a, the suction opener 115a is pivoted to 115e to enable it to raise and lower through a 45 degree angle to conform to the tilt of the bag 121. The joint 115d enables the spring 115g to hold the end piece 115c at a 90 degree angle against the bag 121, and to straighten out to let the opener 115a retract. The magnetic opener 115b has a pivoted magnet 115h and operates similarly to the suction opener 115a. Suction opener 115a has a suction tube 115f leading to the suction cup 115c, and magnetic opener 115b has electric wires leading to the magnet 115h. A permanent magnet can also be adapted for use. A small suction pump can be attached to each of the three shafts 115k, and the electro-magnet can be operated on the current of each of the three clutches on shaft 115k of FIG. 17.

In FIG. 15 the pusher 112a rides on the two runs 112d, one on each end. Two cords 112j are attached to the pusher 112a and pass over pulleys 112g and wind on reels 112e. One weight in the partition on each side with cords and pulleys 112i, return the pusher 112a to the starting position. The second weight on each side is similarly connected to pushers 112 and 112b. The sprocket 112h drives the shaft 112f. Side gates 114, 114a and 114b, and cross gates 113 and 113a, and posts 114g, are indicated. FIG. 20 shows a side view.

The supporting platform 116h in FIGS. 16 and 16a, rests on the fixed floor 116c, and has a recess 116i for inserting the hand to lift the package 116f off the elevator platform 116h. Two cords 116g attached to each side of the platform 116h, pass over pulleys 116e to a drive shaft and reels similar to FIG. 13. The elevator 116h rides up and down on the two runs 116m.

There is one bag opener 115 on each side of each bag compartment 13, 14 and 15, in FIG. 17, which are drawn outward by cords 115p that wind on reels 115j on shaft 115k, driven by sprocket 115m. There is one bag tilter for each bag compartment 13, 14 and 15, which is a vertical backboard 119d that rides on the two rods 119a, and has a tilting panel 119c attached to vertical backboard 119d by two hinges 119b, that moves outward and upward about 45 degrees by a similar arrangement of cords, reels, shafts and sprockets as the bag opener 115.

In FIGS. 18 and 18a, two of the threaded rods 121c with bearings 121b at each end, support the folded bags 121 by the reinforcing and mounting strip 121a, one to each thread, that move forward by turning the threaded rods 121c, which can also support and move the backboard 119d forward. Two of the smooth rods 119a and bearings 121e at each end, support the folded bags 121 by the reinforcing pieces 121a, that move forward by being pushed by the vertical backboard 119d.

A package of a definite number of folded bags 121, in FIGS. 19 and 19a, are held together at the top by the clamps 121g, to exactly fit on the threaded rod 121c, with one bag to each thread. The clamps 121g are a strong and rigid material. The band 121i, which can be paper or other suitable material, holds the bags 121 at the bottom. Both 121g and 121i are removed when the bags 121 are properly mounted on the threaded rods 121c. This method of packing is not necessary for the smooth rods 119a.

The drive shaft 108 in FIG. 20 is connected to each winding reel shaft of each packaging mechanism by an electric clutch FIG. 24. Chains 110c on sprockets connect the main drive shaft 108 with the clutch driving shaft 117f, and the clutch driven shaft sprocket 117g by the chain 117j with the winding reel shafts 113f, 114h, 112f, 115k, 116n, 119e and 119f of the packaging mechanisms. Two reels each on three shafts 113f operate the cross gates 113, 113a and 113b, over pulleys 113c and 113d, and three shafts 114h operate the side gates 114g. Three shafts 115k operate the bag openers and tilters 115, 115a and 115b. Two cords 115p from the two reels on each shaft 115k pass over the pulleys on the pivots 115s and are attached to the sliding rods 115 that run through the pivoted frames 115e, and draw the magnet openers 115h which are attracted to the magnetic material 121j, and open the folded bag 121. Two additional cords 115v from the reels on each shaft 115k pass over pulleys 115w and 115u and draw the pivoted frames 115e of the openers 115 downward, which elevates the magnetic openers 115h on the forward end to correspond with the tilt of the bags 121. Spring 115r attached to the inner end of rod 115 and to a projection 115i of the pivoted frame 115e, returns rod 115. Spring 115t attached to the pivoted frame 115e and to the partition of the bag storage compartment 13, 14 or 15, return pivoted frame 115e to the horizontal position. Three shafts 116n operate the package elevators 116, 116a and 116b described under FIG. 16. Three shafts 119e operate the forward movement of the three tilters 119c by two cords 116g over pulleys 116e. Two cords 119m turn the large reels 119k which turns an attached small reel that winds the cord 119j attached to the vertical backboard 119d which moves forward the thickness of one folded bag 121 each cycle. Cords 119m and 119j only wind up each cycle. Vertical backboard 119d is returned by pressing the release 117h on clutch FIG. 24, which allows the shaft 119e to unwind the cord 119m and draw the vertical backboard 119d back to make space for additional bags 121. There shafts 119f operate the tilting of the hinged panels 119c which are attached to vertical backboard 119d by two hinges 119b, and have arms 119p attached to support pulleys 119i. Two cords 119g from the two reels on shaft 119f pass over pulleys 119p and draw the tilting panel 119c outward about 45 degrees, and tilt all of the bags 121 that are ahead, which gives a cushion effect to the open bag 121 that is being filled. A spring 119h attached to the vertical backboard 119d returns the tilting panel 119c to the vertical position in conjunction with gravity. The vertical backboard 119d rides on the two rods 119a at the top, and on rod 119n in the center of the bottom as a guide. The folded bags 121 are mounted on the two supporting rods 119a through the opening 121b. Cords 119j decrease in length and cords 119g increase in length as the vertical panel 119d moves forward, which are automatically compensated for by the amount of cord wound and unwound from the reels. The movable vertical backboard 119d of the bag holder compartment is only inched forward. The stock of bags is replenished by pushing an electric button in the circuit of the magnet 117n of the holding ratchet 117c in the clutch FIG. 24 for the bag incher, to release the winding reels 119e to revolve backward, and to permit pushing the vertical backboard 119d to the rear and place the new bags on supporting rods 119a in front of the vertical backboard 119d. An electric push button in the circuit of the connecting magnet 117k of the clutch will compact the bags.

Energizing the solenoid 122c in FIG. 21, draws the catch 122a in and releases the projecting piece 122d so that an elevator that rises will fall by its own weight. The spring 122b causes the catch 122a to automatically lock the elevator. This device can also be applied to side gates 114, 114a and 114b, and to cross gates 113, 113a and 113b, both of which return by their own weight, and to the openers 115, 115a and 115b, out and up, and the tilter 119c, which have spring returns, 115r, 115t and 119h respectively. This catch is a substitute for the holding ratchet in the driving clutches.

The switch 123c in FIG. 22, is normally closed. The stop 124 snaps the lever 123a over, which opens the switch 123c at the end of the forward run, which releases a magnetic switch similar to that shown in FIG. 5 for the control board keys. A spring or weight returns the device to the starting point, and the stop 124 snaps the lever 123b over, and the connecting cord 123d pulls lever 123a back, which enables switch 123c to close, ready for the next cycle. The catch in FIG. 21 can hold the device in the forward position until the solenoid 122c lets the device return. This arrangement applies to the cross gates 113, 113a and 113b, the side gates 114, 114a and 114b, the pushers 112, 112a and 112b, the bag openers and tilters 119, 119a and 119b. The springs 123e push the toggle levers 123b and 123a completely over. The switch arms 123a and 123b have rings 123f to hold the cord 123 in place. The switches can be located in a protected position for remote control. The switches can be at the front or rear end and can be normally open if desired. This switch can also be used to control a reciprocating motion.

The cord 123 in FIGS. 23 and 23a runs between the two sections 124a and 124b of an adjustable stop that is held together by the screw and lock washer 124c. The cord 123 is held firmly by a groove 124e in two linings 124d made of rubber or other suitable compressible material.

In FIGS. 24, 24a and 24b, energizing the solenoid 117k of the electric clutch, draws in the plunger 117i connected to the pivoted arm 117d, which forces a slidable radial toother band 117m on the driven shaft 117m against the attached radial toothed band on the driving shaft 117f. Power is transmitted to a secondary shaft by sprocket 117g and chain 117j, and the shaft can have a set of winding reels thereon. The spring 117q holds the ratchet 117h against the toother wheel 117c which prevents the driven shaft 117m revolving backward until the solenoid 117n is energized. A switch conveniently mounted is used to energize the solenoid 117n to let the reel unwind so that the vertical panel 119d of the bag tilting device can be pushed back to receive additional folded bags 121. An adjustable brake 117e can be used to apply a tension on the loose section 117m. These clutches are used on all of the packaging devices that have a reciprocating movement, including the elevators, which require no holding ratchet.

In FIGS. 26, 26a and 27, the posts 125, shelves 126, pistons 128, extension steps 127, reel 137, and the castors 131 are a unit, and the cylinders 129, lower platform 130, control panel 138, panel support 138a, wheels 132, motor 135, pump 134, tank 133a, and the tubing 133, are another unit that can move independently. The shelf unit 126 can raise and lower by means of the pistons 128 and the cylinders 129, to adjust the shelves 126 of the loader to the exact height of a row of dispenser units so that the articles 30 can be slid from the loader shelf 126 to the dispenser units 1 and 2. The reel 137 supplies electric current to the portable loader from a centrally located outlet 6, preferably in the ceiling, and the reel 137 can be at the outlet or on the loader. The projecting arm 137c has a hole for the supply cord 137b to pass through and turn the swivel base 137a. The frame 137d has a fixed shaft 137e that the reel 137g revolves on. One end of a coiled spring 137f is attached to the shaft 137e and the other end to the inside of the drum 137g. The two wires of the cord 137i connect to two bands 137j which have two brushes 137h, which are insulated and connected to the wiring of the loader.

Pressing the button 136 in FIG. 28, starts the motor 135, and the pump 134 forces a fluid such as oil, from the tank 133a into the four cylinders 129 below the pistons and raises the shelves 126. Moving the valve 135a over, lets the weight of the shelf section 126 force the fluid out of the four cylinders 129 back into the tank 133a, and lowers the shelves 126. Turning the valve 137 and pressing the button 136 causes the motor 135 and pump 134 to force fluid above the pistons of the cylinders 129, out of the tank 133a, and raise the lower platform section 130 and the wheels 132 off the tracks 136 so the loader can travel on the four castors 131 in any direction. The support 138a attaches the control panel 138 to the lower unit 130 of the loader which contains the operating mechanism, so as to raise the panel 138 to a convenient height.

The platform 130 in FIG. 29, is raised against the bottom shelf 126 so the wheels 132 do not touch the floor, and the castors 131 carry the entire loader. A side view of the tank 133a, motor 135, and pump 134 are shown. The track 136 is flush with the floor.

The two-way valves 139 and 141 in the tubing diagram in FIG. 30, are identical and can be mounted on the same stem and knob 137. The fluid can be routed by a quarter turn of the valve 137 either into or out of the cylinders 129 and tank 133a. The one-way valve 143 is by-passed by valve 142 controlled by the lever 135a on the control panel 138. A vent line 134a extends upward and prevents a vacuum or pressure in the tank 133a.

In FIGS. 31, 31a, 31b and 32 of the coin operated dispenser unit, the coin or coins are inserted in the slot 154a and roll down the incline 154b to the position 154 on the floor 153. Drawing the handle 156 forward pulls the movable center section 156a of the dispenser unit, and projection 159 releases the pivoted angle member 158, and the spring 160 pulls the pivoted angle member 158 forward, which moves the upright pivoted lever 151 forward, and the coins 154 move the upright pivoted lever 151a in the same direction, and one of the two cords 149 running over the pulleys 147 and 147a, draws the pivoted locking arm 148 to the off position, and the other cord 149 draws the pivoted door closing arm 144 that opens the door 146. The cord 150 attached to the lever 151a passes over the pulleys 147 and 150a and draws the pivoted catch 162 to the off position, which lets the movable center section 156a move all the way forward. When the tension on the double cords 149 and the single cord 150 is released by the return of the movable center section 156a, the spring 143 closes the door 146, and the spring 145 returns the pivoted door locking arm 148 and locks the door 146, and the spring 162a returns the catch 162 and locks the movable center section 156a, which also causes spring 152 to return the upright pivoted lever 151a, and spring 152b to return upright pivoted lever 151. Spring 160 is stronger than spring 152b. Without the proper coins in place the gate 146 and the movable center section 156a will remain locked, as only upright pivoted lever 151 will move forward. The main return spring of the dispenser unit holds the movable center section 156a back, and the projection 159 presses against pivoted angle member 158 when the dispenser unit is not in operation. If the wrong coins are inserted, pushing down the forward knob 153c tilts the floor 153 forward and the coins 154 roll into the return receptacle 155. The spring 153b is attached to the lower part of pivoted floor tilting angle 153a that is attached to the pivot of the coin floor 153 in the far vertical space and holds the floor 153 horizontal. The pivoted floor tilting angle 153c with a projection at a right angle, is loose on the same pivot as the floor 153, and lets the projecting arm 159 on the movable center section 156a pass by without any effective action in going forward, but in returning, the projecting arm 159 strikes the upper part of pivoted floor tilting angle 153c and tilts the coin floor 153 so the coins 154 roll backward into a container at the bottom of the assembly. The upright pivoted levers 151 and 151a have slots in them that are only high enough to let any coin through when the floor 153 is tilted. The upright pivoted lever 151a has a projection 151b in the space next to the coins 154 that gives greater leverage for the cords 149 and 150. Guard piece 152a confines the coins 154. Coins that are too small cannot move the forward upright pivoted lever forward as the restricted movement of the rear upright pivoted lever will only be sufficient to close the space between the coins, without moving the forward upright pivoted lever ahead, and a coin that is too large has insufficient space to go down to the tilting floor, and will move upward instead of pushing the forward upright pivoted lever ahead. The movable center section 156a has raised side flanges 156b to support the articles. Spring 161a holds catch 161 back.

In FIG. 33, 143 is the door opening spring, and 144 is the door closing arm, 148 is the door locking arm, and 145 is the door locking arm spring, 151b is the forward upright pivoted lever, 158 is the pivoted angle member that pushes the rear upright pivoted lever 151 forward, 153c is the floor tilting angle, 153b is the spring that holds the coin floor 153 in the normal position, and 159 is the projection on the movable center section 156a.

The flap 165 in FIG. 34 is pivoted to the fixed frame of the coin operated dispenser unit, and it can rise through the long slot 166 in the movable center section 156a. Removal of the forward article causes the spring 165a to pull the flap 165 up, and the cord 164a passes over the pulley 164 and draws the pivoted lever catch 161 back to engage projection 164b and prevent the moving center section 156a from going back sufficiently far to let the coins 154 out and to be locked by pivoted holding lever 162. The distance of projection 164b from the front is a little less than the length of the contained article. The elongated projection 167 on the movable center section 156a unlocks the pivoted locking arm 170 so the article has time to push flap 165 down before the flap 165 returns to the locking position. When the customer removes the first article in the dispenser unit, the flap 165 instantly springs up and depresses and passes over the pivoted locking arm 170, which springs up again and automatically locks the flap 165 and prevents the customer from removing a second article. Angle 169 holds arm 171.

The coin or coins are inserted in the slot 154a in the front of the coin manual operated dispenser unit in FIG. 35. Pressing the arm 153a returns improper coins to the return coin receptacle 155. The enclosing door 146 is hinged at the top and has a transparent panel 172. The pull handle 156 that draws the movable center section 156a outward, is between two panels 173 that can have the name and the price thereon if desired.

One or more coins in FIG. 36 roll down the incline 154c which is of an insulating material. The sides and floor of the coin compartment are also insulated. The weak spring 174b holds the contact 174a, which is limited in the forward movement, against the coins and the coins against the contact 174. Contacts 174 and 174a are insulated except at the ends. The coin floor 153b is tilted so the coins will roll rearward. The stop 159a strikes the floor tilting angle 153c on the forward motion of the movable center section 156a and lets coins 154 roll into a storage container.

The power coin operated dispenser unit in FIG. 37 is operated by connecting two electric contacts 174 and 174a by the proper coins as shown in FIG. 36, which energizes the solenoid 181 in FIG. 37, that draws the pivoted arm 180 inward, and the gear 183 meshes with the revolving fluted shaft 184 that is positioned horizontally behind the row of dispenser units, and the reel 182 winds a cord 186, or other suitable flexible substitute, which is guided around pulley 186a and is attached to a projection 176 on the movable center section 156a, which is drawn forward to move the contained articles forward. The adjustable stop 124 is set on the cord 186 to conform to the length of the contained articles, and opens the switch 178 momentarily, which disconnects the magnetic switch 181a in FIG. 37a, that is in series with electric contacts 174 and 174a. The spring 179 pulls the pivoted arm 180 over and disconnects the gear 183. The spring 185 returns the movable center section 156a to the starting position. The spring 185 is stronger than spring 160 of FIG. 38, and spring 160 is stronger than spring 152b of FIG. 31. This dispenser unit operates by the difference in level between a fixed frame 156b and a movable center section 156a, and the mechanism is at the rear of the dispenser unit so the movable center section 156a can go forward without cutting out to any extent to pass the revolving shaft 184. The mechanism shown in FIG. 37 is also used in the assembly of dispenser units in the complete automation installation to bring the contained articles forward, and is activated by a magnetic key 38 on the keyboard 44, the switch 178 releasing the magnetic key 38. This mechanism is also used in the automatic dispenser unit described in connection with FIGS. 40 and 40a.

The wiring diagram in FIG. 37a applied when the mechanism in FIG. 37 is used in an automatic dispenser unit operated by a switch 191 and 191a at the front of the dispenser unit in FIGS. 40 and 40a, that is brought into contact by the removal of the article 30, which causes the magnet 181b to close the switch 181a and energizes the solenoid magnet 181. The stop 124 momentarily disconnects switch 178 which disconnects switch 181a. Switch 191 and 191a disconnects when the article is removed, so the spring 185 can return the movable center section for the next cycle.

The projection 159 in FIG. 38 of the power coin operated dispenser unit, moves forward with the movable center section 156a, and the spring 160 pulls the pivoted arm 158a forward. The cord 148a passes over the pulley 158b and draws the pivoted locking arm 148 up and unlocks the door 146, and the cord 144a pulls the pivoted lever 144 backward and opens the door 146. This arrangement is in the vertical space at the side of the dispenser unit next to the coin space and serves the same purpose as the pivoted angle member 158 and the upright pivoted lever 151a in FIGS. 31 and 32, except that the coins are not involved. The locking arm 162 of FIGS. 31 and 32 is not required as there is no projecting handle to pull the movable center section 156a outward. The other features of the power operated dispenser unit are the same as the manually operated unit.

In FIG. 34 the flap release 165 that is operated by the weight of the article, may be of insufficient strength to function satisfactorily with light weight merchandise. The flap 165 in FIG. 39a moves upward by means of a spring when released by removing the article, and momentarily connects the switch 187a, which energizes the solenoid 188 in FIG. 39, that forcibly unlocks the pivoted arm 161 from the projection 164b on the movable center section 156a, against the friction caused by the pull of the return spring 185 of the movable center section 156a of the dispenser unit.

The electrical starting switch in FIGS. 40 and 40a, is installed on the forward end of the dispenser unit containing the operating mechanism in FIGS. 37 and 37a, and is attached to the fixed frame 156a. Removing the forward article 30 from the dispenser unit mechanically pushes the pivoted metallic lever 189 forward and connects switch arms 191 and 191a, which closes the magnetic switch 181a that energizes the solenoid magnet 181 and causes the dispenser unit mechanism to move the remaining articles forward. Piece 156c is an extension of 156b. The mechanism and the operation of this dispenser unit is the same as in the dispenser unit in FIG. 37, and the wiring diagram is the same as in FIG. 37a except that the switch at the front of the dispenser unit 191 and 191a acts in place of the pivoted levers 174 and 174a which are connected by the coins. The lock 192 for the pivoted lever 189 is normally off, but the lock can be pulled to the on position by a cord 194 from the lock 192 connected to a lever at the rear of the dispenser unit, to prevent pushing an article out the front when loading from the rear. Spring 195 holds lock 192 off. The dispenser unit can be inclined so the top of the article will project outward to provide a hold, or the metallic lever 189 can be pulled down manually and the article grasped as it comes out.

The two pieces 196 in FIGS. 41 and 42, are attached to the fixed frame 156b of the rising and lowering movable center section type of dispenser unit, and project outward from the front a sufficient distance to support the article 30 after it has been brought out of the dispenser unit for delivery by the movable center section 156a, which can retract at once without the necessity of taking hold of the article 30 to prevent it falling. The automatic device 189a of FIG. 40 is indicated. The coin platform 153 is indicated. Nos. 155 are coin cups.

Pushing key 39 of the control keyboard 44, closes a magnetic switch 51 and 51a in FIG. 5, which energizes the solenoid 200 in FIGS. 43 and 44, that draws the plunger 198 in, and the plate 199 pushes the number tag 201 out onto the conveyor belt 27b. The plunger 198 operates a two toggle lever switch. FIG. 22, at the end of the forward motion that shuts off the current to the solenoid 200 and lets the magnetic switch 51 and 51a open. The spring 197 returns the plate 199 to its normal position and closes the switch 123c in FIG. 22, ready for the next cycle.

The bar 202 is FIG. 45 slides through the support 204 which is fastened to the fixed frame 156b. The screw and lock washer 203 hold the bar 202 after it has been set to conform to the length of the article. The rear end of the movable center section 156a strikes against the knob 205 at the end of the bar 202. This device is used only on the manually operated dispenser units that have no other means of limiting their forward motion.

Many of the mechanisms and the methods of control of the manual and power operated, and the automatic dispenser units, and the coin operated devices, the conveyor system, the control board, the registering mechanism, the packaging equipment, the package elevator, the loader, the tab dropper, the alternate devices, and the accessories, are interchangeable, and numerous modifications are possible, and the claims should be interpreted to cover all variations and rearrangements that can reasonably be included in the general method of accomplishing the desired result of a coordinated and complete automation system of dispensing merchandise.

The invention claimed is:

1. In an automation dispensing mechanism consisting of an assembly of electrically operated dispenser units in a supporting rack, a plurality of fluted driving shafts, a plurality of conveyor belts and slides, a control keyboard, a price register, a plurality of packaging mechanisms, a plurality of package elevators, a loader truck, and a tab dispenser; a gate to provide an inspection compartment on a horizontal conveyor belt, a control keyboard with a plurality of magnetic switches each switch releasable by a spring switch in a dispenser unit, a plurality of rotatable price dials in a control keyboard with electrical connections for a plurality of pricing numerals and means of rotating the price dials to change the price, a hinged protective cover over each pricing dial that activates a magnetic switch controlling each dispenser unit, means of operating a price and total printing register by electrical connections from the pricing dials of the control keyboard operated by the same key controlling each dispenser unit, a plurality of solenoid magnets each with a one piece plunger that moves the same distance for all numerals and that operates pricing dials and elevates visible price numerals, a plurality of printing dials mounted on concentric telescopic shafts turning on a fixed shaft, a magnetic material placed in a non-magnetic dial with an electro-magnet to return the dial to the zero position, means of a printing dial turning the adjacent printing dial one digit by a connection through an aperture in a fixed disc between the dials, means of recording and totalling a ½ cent price, a plurality of side and cross gates on a conveyor belt with means of raising and lowering the gates in a predetermined sequence, a plurality of driving and driven shafts each driven shaft operated by a clutch that can be permitted to and prevented from rotating in reverse, the driven shafts operating by winding reels and cords to move forward, tilt, and open a packaging bag, to tilt a bag opener and to push the articles into a packaging bag, means of disconnecting and connecting the clutches of the packaging equipment by a cord with an adjustable stop thereon engaging remote connected toggle levers that operate an adjacent spring switch, a reinforcing and mounting strip for the packaging bags, a magnetic material applied to the bags, means of magnetically opening the bags, magnetic means of mechanically releasing the elevator, a handhole in the floor of the elevator, the complete packaging equipment operated by a single key on the control keyboard for each size packaging bag, a loading truck for the dispenser units constructed in two sections movable in relation to each other, the lower section capable of travelling on wheels on tracks positioned in relation to the dispenser units, the upper section capable of travelling in any direction on the floor on castors, means of moving the upper section upward and downward to level with the dispenser units, shelves on the loader truck designed to facilitate pushing the articles into the dispenser units in a single line, an arrangement of the automation mechanism that separates the space for customers from the space for employees so the customers have no access to the stock of merchandise.

2. In an automation dispensing mechanism as described in claim 1; a series of three interacting electrical circuits for the packaging equipment, the first circuit comprising a magnetic switch on the control keyboard for each size of packaging equipment that activates the spring of the associated gates, the bag tilting and bag opening devices, and releases the elevator, the associated side gates mechanically opening a spring switch at the top of the upward movement that disconnects the magnetic switch on the control keyboard which inactivates the first circuit, the associated side gate simultaneously mechanically closing a magnetic switch in the second electrical circuit that activates an associated pusher and releases the cross gate at the inspection compartment, the pusher mechanically opening a spring switch at the end of the forward run momentarily breaking the current of the magnetic switch in the second circuit which inactivates the second circuit, the pusher simultaneously mechanically connecting a spring switch at the front end of the run by an adjacent toggle lever in the third electrical circuit, which releases the pusher and the associated cross and side gates and the bag opener and tilting devices, and raises the elevator, the pusher mechanically inactivating the third circuit on the return by releasing the front toggle switch by a connecting cord from the rear toggle switch.

3. An automation dispensing mechanism as described in claim 1; including a pair of threaded rods to support the packaging bags, means of rotating the threaded rods to move the bags forward, means of packing the bags to conform to the threads of the rod.

4. An automation dispensing mechanism as described in claim 1, wherein the means for opening the bags comprise vacuum cups, means of drawing air through the cups, magnetic operated valves in the circuit of the bag opening mechanism to control the air flow.

5. An automation dispensing mechanism as described in claim 1; wherein the action of the plunger of the solenoid magnet is retarded by means of an integral air cushioning mechanism.

6. In an automation dispensing mechanism as described in claim 1, wherein the said tab dispenser comprises an electrically operated means of issuing a numbered tab operated by a key on the control board, said tab dispenser mounted above the inspection compartment, to identify the purchases of a customer who has been given a tab with a corresponding number.

7. In a dispenser unit for articles comprising a movable center section raising on the forward movement to move the contained articles forward, and lowering on the return; a spring switch at the front of the dispenser unit activated by removing the first article closing a magnetic switch which energizes a solenoid magnet, the plunger connected to a pivoted gear that meshes with a fluted driving shaft, a winding reel attached to the gear, a cord from the reel connected to and drawing the movable center section and the contained article forward, an adjustable stop on the cord set to the length of the contained article that momentarily disconnects an adjacent switch which disconnects the magnetic switch and the solenoid magnet, means of returning the movable center section, an electric circuit consisting of a starting switch connected by removing the first article, that activates a magnetic switch which energizes a solenoid magnet, the current continuing after the starting switch disconnects, a stop switch disconnected by the forward movement of the dispenser mechanism that disconnects the magnetic switch and the solenoid magnet.

8. In a dispenser unit with a movable center section raising on the forward movement to move the contained articles forward, and lowering on the return; a manual coin operated mechanism, the insertion of the proper coins between two pivoted spaced levers permitting the pulling of the movable center section forward by a handle, which unlocks and opens an enclosing door so the first article can be removed, means of preventing the removal of the second article by a flap projecting upward, means of preventing the return of the movable center section until the first article is removed, mechanical means of releasing the movable center section from the forward position by removal of the first article, means of returning the movable center section and closing and locking the enclosing door, a tiltable coin floor tilted rearward by the return motion of the movable center section to discharge the coins into a container, a push bar on the tilting floor to return improper coins forward into a return coin receiver, means of preventing pulling the movable center section too far forward by a device adjustable to the length of the contained article.

9. In a dispenser unit with a movable center section raising on the forward movement to move the contained articles forward, and lowering on the return; a coin operated power driven dispenser unit the insertion of the proper coins between a fixed and a pivoted spaced electrical conductors closing a magnetic switch which energizes a solenoid magnet, the solenoid plunger connected to a pivoted gear that meshes with a fluted driving shaft, a winding reel attached to the gear, a cord from the reel connected to and drawing the movable center section and the contained articles forward and unlocking and opening an enclosing door so the first article can be removed, an adjustable stop on the cord set to the length of the contained article, that momentarily disconnects an adjacent switch, which disconnects the magnetic switch and the solenoid magnet, means of preventing the removal of the second article by a flap projecting upward, means of preventing the return of the movable center section until the first article is removed, electrical means of releasing the movable center section from the forward position by the removal of the first article, means of returning the movable center section and closing and locking the enclosing door, a tiltable coin floor tilted rearward by the forward motion of the movable center section to discharge the coins into a container, a push bar on the tilting coin floor to return improper coins forward into a return coin receiver, projecting pieces at the front of the dispenser unit fixed frame to support and prevent the delivered article falling on the floor after being brought forward, an electric circuit consisting of a starting switch activated by inserting the proper coins, which activates a magnetic switch which energizes a solenoid magnet, the electric current continuing after the starting switch disconnects, a stop switch disconnected by the forward movement of the dispenser mechanism that disconnects the magnetic switch and the solenoid magnet.

10. An automation dispensing mechanism as described in claim 1, wherein the means of opening the bag comprises magnetic material applied to the bag, and electromagnets to contact the applied magnetic material and draw the bag open.

References Cited in the file of this patent

UNITED STATES PATENTS

| | | |
|---|---|---|
| 1,981,783 | De Bussey | Nov. 20, 1934 |
| 2,627,941 | Skillman | Feb. 10, 1953 |
| 2,663,398 | Skillman | Dec. 22, 1953 |
| 2,679,354 | Skillman | May 25, 1954 |
| 2,883,004 | Bellino | Apr. 21, 1959 |